United States Patent
Castellino et al.

(10) Patent No.: US 10,493,436 B2
(45) Date of Patent: Dec. 3, 2019

(54) METHOD FOR THE SIMULTANEOUS REMOVAL OF CARBON MONOXIDE AND NITROGEN OXIDES FROM FLUE OR EXHAUST GAS

(71) Applicant: Haldor Topsoe A/S, Kgs. Lyngby (DK)

(72) Inventors: Francesco Castellino, Birkerød (DK); Viggo Lucassen Hansen, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 36 days.

(21) Appl. No.: 15/968,889

(22) Filed: May 2, 2018

(65) Prior Publication Data

US 2018/0250661 A1    Sep. 6, 2018

Related U.S. Application Data

(62) Division of application No. 14/767,003, filed as application No. PCT/EP2014/052043 on Feb. 3, 2014, now abandoned.

(30) Foreign Application Priority Data

Feb. 14, 2013   (DK) ................. 2013 00091

(51) Int. Cl.
  *B01D 53/94* (2006.01)
  *B01J 23/648* (2006.01)
  *B01J 21/06* (2006.01)
  *B01J 23/22* (2006.01)
  (Continued)

(52) U.S. Cl.
  CPC ...... *B01J 23/6482* (2013.01); *B01D 53/9468* (2013.01); *B01J 21/063* (2013.01); *B01J 23/22* (2013.01); *B01J 35/0006* (2013.01); *B01J 35/023* (2013.01); *B01D 2255/1023* (2013.01);
  (Continued)

(58) Field of Classification Search
  None
  See application file for complete search history.

(56) References Cited

U.S. PATENT DOCUMENTS

| | | |
|---|---|---|
| 7,390,471 B2 | 6/2008 | Sobolevskiy et al. |
| 8,226,896 B2 | 7/2012 | Pfeifer et al. |
| 2009/0199546 A1 | 8/2009 | Doring |

(Continued)

FOREIGN PATENT DOCUMENTS

| | | |
|---|---|---|
| DE | 10 2008 055 890 A1 | 5/2010 |
| EP | 2 426 326 A1 | 3/2012 |

(Continued)

OTHER PUBLICATIONS

Garcia et al., "Total oxidation of volatile organic compounds by vanadium promoted palladium-titania catalysts: Comparison of aromatic and polyaromatic compounds," Applied Catalysis B: Environmental 62, pp. 66-76 (2006).

(Continued)

*Primary Examiner* — Anita Nassiri-Motlagh
(74) *Attorney, Agent, or Firm* — Blank Rome LLP

(57) ABSTRACT

A method in which flue gas or exhaust gas containing harmful carbon monoxide, organic compounds (VOC) and NOx is contacted with a layered catalyst. A first layer of the catalyst comprises an oxidation catalyst. An underlying layer of the catalyst comprises a NH3-SCR catalyst for the simultaneous removal of the carbon monoxide and NOx.

7 Claims, 1 Drawing Sheet

(51) Int. Cl.
    *B01J 35/00*     (2006.01)
    *B01J 35/02*     (2006.01)

(52) U.S. Cl.
    CPC .............. *B01D 2255/20707* (2013.01); *B01D 2255/20723* (2013.01); *B01D 2255/9022* (2013.01)

(56) References Cited

U.S. PATENT DOCUMENTS

| | | |
|---|---|---|
| 2010/0101221 A1 | 4/2010 | Charbonnel |
| 2010/0290965 A1 | 11/2010 | Pfeffer |
| 2012/0328499 A1* | 12/2012 | Ando ................. B01D 53/9431 423/213.5 |
| 2013/0065754 A1 | 3/2013 | Shinmyo |

FOREIGN PATENT DOCUMENTS

| | | |
|---|---|---|
| EP | 2 551 014 A1 | 1/2013 |
| WO | WO 2012/059144 A1 | 5/2012 |
| WO | WO 2012/170421 A1 | 12/2012 |

OTHER PUBLICATIONS

Madia et al., "The Effect of an Oxidation Precatalyst on the NOx Reduction by Ammonia SCR," Ind. Eng. Chem. Res. 2002, 41, pp. 3512-3517 (2002).

\* cited by examiner

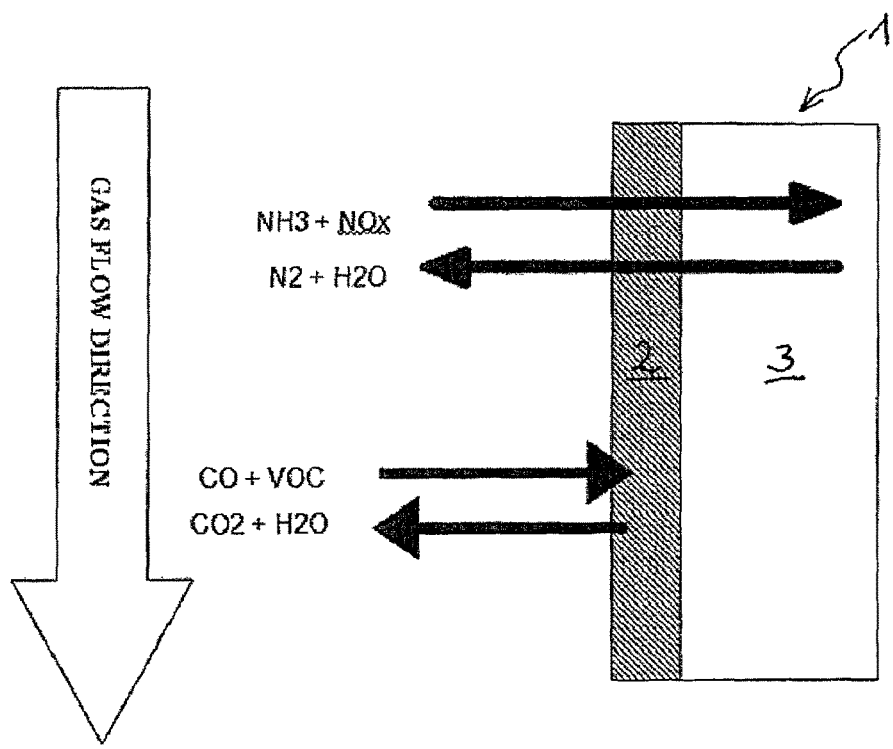

METHOD FOR THE SIMULTANEOUS REMOVAL OF CARBON MONOXIDE AND NITROGEN OXIDES FROM FLUE OR EXHAUST GAS

This is a divisional of U.S. patent application Ser. No. 14/767,003, filed Aug. 11, 2015, now abandoned, which is a 371 of International Application No. PCT/EP2014/052043, filed Feb. 3, 2014, which claims priority to Denmark Application No. PA 2013 00091, filed Feb. 14, 2013, the entire disclosures of which are incorporated by reference in their entireties.

BACKGROUND OF THE INVENTION

The present invention relates to a method and catalyst for the simultaneous removal of carbon monoxide and nitrogen oxides (NOx) contained in flue or exhaust gas.

More particularly, the invention provides a method, where flue gas or exhaust gas containing harmful carbon monoxide, organic compounds (VOC) and NOx is contacted with a layered catalyst in which a first layer comprises an oxidation catalyst and in an underlying layer a NH3-SCR catalyst for the simultaneous removal of the carbon monoxide and NOx.

Removal of NOx, VOC and CO from flue or exhaust gas is conventionally exercised by use of two different catalyst compositions, wherein an oxidation catalyst is arranged upstream of an SCR catalyst with injection of a reductant between the catalysts. NOx removal is typically performed by selective catalytic reduction (SCR) with NH3 on vanadium oxide or zeolite-based catalysts in monolithic form. Ammonia is injected upstream the SCR catalyst and reacts with the NOx on the catalyst surface. An optimal temperature window for the vanadium oxide-based catalysts is 200-400° C., while zeolite based catalysts are more active at temperatures >400° C.

In the case of CO and VOC removal by catalytic oxidation, the platinum metals are the most common choice due to their high reactivity already at temperatures >200° C.

As an example of a flue gas containing both CO, VOCs and NOx is the flue gas from a turbine operating on natural gas. Traditionally, in the HRSG design the CO oxidation catalyst, often based on Pt, is located upstream the SCR catalyst and the ammonia injection grid ("AIG"). This location has been chosen mainly due to the fact that the oxidation catalyst is very active in the oxidation of NH3 to NOx, which is highly undesired. Having the CO oxidation catalyst located upstream the AIG makes sure that no NH3 is wasted, but all amounts of injected ammonia reach the SCR catalyst limiting the operation costs of the utility.

In an alternative configuration, the oxidation catalyst is arranged downstream the SCR catalyst. When positioned this way the oxidation catalyst is operated at lower temperatures than the conventional layout. The problem with this configuration is that if not designed correctly, the oxidation catalyst may oxidize the NH3 slip to NOx, thus reducing the overall NOx removal of the plant. Possibly, the oxidation catalyst may be designed in a way that NH3 is converted to N2 instead, but such a catalyst is typically more expensive than a conventional oxidation catalyst due to both the kind and quantity of the noble metals used for its production.

In the above configurations, the resulting reactor consists of two separate catalyst units, i.e. one SCR catalyst unit and one oxidation catalyst unit. More precisely, the total volume of catalyst installed will be determined by the size of the SCR catalyst unit, plus the size of the oxidation catalyst unit.

In order to reduce the size of the reactor, a combination of the two catalysts partly on the same support has been attempted and in some cases accomplished.

U.S. Pat. No. 7,390,471 discloses an exhaust gas treatment apparatus for reducing the concentration of NON, HC and CO in an exhaust gas stream. The treatment apparatus includes a multifunction catalytic element having an upstream reducing-only portion and a downstream reducing-plus-oxidizing portion that is located downstream of an ammonia injection apparatus. The selective catalytic reduction (SCR) of $NO_x$ is promoted in the upstream portion of the catalytic element by the injection of ammonia in excess of the stoichiometric concentration with the resulting ammonia slip being oxidized in the downstream portion of the catalytic element. Any additional $NO_x$ generated by the oxidation of the ammonia is further reduced in the downstream portion before being passed to the atmosphere. The reduction-only catalyst may be vanadium/TiO 2 and the reduction-plus-oxidizing catalyst includes a reduction catalyst having 1.7 wt percent of vanadium/TiO2 impregnated with 2.8 g/ft 3 each of platinum and palladium.

However, the SCR activity of the oxidation catalyst is considerably lower than the SCR activity of an SCR-only catalyst meaning that the total volume of catalyst installed will be equal to the volume of the oxidation catalyst plus the volume of the SCR catalyst needed to compensate for the low SCR activity of the oxidation catalyst.

In the cleaning of gas turbine flue gas as an example, number one priority from a utility point of view is to reduce the total catalyst volume as much as possible. Large volumes in fact mean high pressure drop across the catalyst bed and overall lower efficiency of the HRSG. The pressure drop has a direct impact on the net power achievable from the turbine and an in-direct effect on the heat flux, i.e. the calories that can be extracted from the flue gas by the HRSG.

In order to reduce the catalyst volume to a minimum, the SCR activity of the oxidation catalyst has to be increased to the same high levels of an SCR-only catalyst. One essential condition for obtaining this is the use of an oxidation catalyst very active in the oxidation of CO and VOC, but not reacting with NH3. Another important condition is that the oxidation catalyst must still have the same oxidation activity as an oxidation-only catalyst.

SUMMARY OF THE INVENTION

By the present invention, the above noted two conditions are achieved, the total volume of the resulting catalyst for the combined removal of both CO, VOC and NOx is equal to the volume of the largest catalyst between a dedicated oxidation and a dedicated SCR catalyst, which depends on the required removal of CO, VOCs and NOx for a particular installation.

Thus, this invention provides a method for the reduction of amounts of carbon monoxide, volatile organic compounds and nitrogen oxides in flue or exhaust gas, said method comprising the steps of:
introducing ammonia and/or a precursor thereof into the flue or exhaust gas;
converting the precursor if any into ammonia; and
contacting the gas and the ammonia at a temperature of up to 350° C. with a layered catalyst comprising in flow direction of the gas an upper first catalyst layer with an oxidation catalyst and an underlying second catalyst layer with an NH3-SCR catalyst supporting completely the first layer and oxidising at least part of the amounts of carbon monoxide and the volatile organic compounds in the upper first layer without affecting the ammonia further contained in the gas and reducing the amounts of nitrogen oxides in the underlying second catalyst layer by reaction with the ammonia.

A CO, VOC oxidation catalyst not active in the oxidation of NH3 at temperatures up to 350° C. for use in the method according to the invention has been developed.

Thus, in an embodiment of the invention, the oxidation catalyst in the first layer consists of palladium, vanadium oxide and titanium oxide.

By coating this catalyst on a commercial NH3-SCR catalyst e.g. a NH3-SCR catalyst in comprising oxides of tungsten, molybdenum, vanadium and titanium according to a further embodiment of the invention, the resulting catalyst consists of a first catalyst layer oxidizing CO and VOC but not ammonia and a second layer of NH3-SCR-only catalyst.

BRIEF DESCRIPTION OF THE DRAWINGS

FIG. 1 is a drawing showing the reactions as the gas contacts the layered catalyst.

DETAILED DESCRIPTION OF THE PREFERRED EMBODIMENTS

Referring to FIG. 1, at gas temperatures up to 350° C., CO and VOC will be oxidized to CO2 in the first oxidation layer 2 of layered catalyst 1, while all injected NH3 for the NOx abatement will simultaneously diffuse through oxidation layer 2 and react instead on the underlying SCR catalyst layer 3.

By enhancing the pore structure and thickness of the first catalyst layer, both NOx and NH3 will easily access the underlying SCR catalyst and very limited SCR activity will be lost due to the diffusion rate of reagents across the oxidation catalyst layer.

Thus, in a further embodiment of the invention the first catalyst layer has a layer thickness of between 10 and 200 micron, preferably of between 10 and 50 micron.

In the method according to invention as described above, the flue or exhaust gas can additionally be treated with a conventional not layered SCR catalyst either up or downstream the layered catalyst.

The invention provides additionally a catalyst for simultaneous oxidation of carbon monoxide and volatile organic compounds and selective reduction of nitrogen oxides by reaction with ammonia, the catalyst comprises a first layer of an oxidation catalyst and a second layer of an NH3-SCR catalyst supporting completely the first layer.

Preferably, the oxidation catalyst consists of palladium, oxides of vanadium and oxides of titanium.

The preferred oxidation catalyst according to an embodiment of the invention also has some SCR activity due to the presence of both TiO2 and vanadium oxides. Full SCR activity is thus preserved without the need of increasing the addition of ammonia. In this way, the desired removal of both CO and NOx can be accomplished with a significantly reduced catalyst volume.

In an embodiment of the invention the first catalyst layer has a layer thickness of between 10 and 200 micron, preferably of between 10 and 50 micron.

When structuring the layered catalyst in monolithic form, the resulting monolith catalyst will have a uniform catalyst composition across the monolith length. CO, VOC and NOx removal proceeds simultaneously along the whole length of the monolith.

EXAMPLE

A V/Ti based commercial SCR catalyst has been coated with a catalyst consisting of 0.45 wt % Pd, 4.5 wt % V2O5 on TiO2. The NOx removal efficiency has been measured and compared to the NOx removal efficiency of the same SCR catalyst not coated with the oxidation catalyst. The results and conditions of the test are shown in Table 1 below:

TABLE 1

|  | DeNOx, % | DeCO, % | NH3 slip, ppmv |
| --- | --- | --- | --- |
| SCR | 93.5 | 0 | 5.7 |
| OXIDATION + SCR | 92.9 | 97.8 | 4.4 |

Test Conditions.

Gas inlet composition: 50 ppmv NOx, 55 ppmv NH3, 100 ppmv CO, 15% vol O2, 10% vol H2O, N2 balance. Gas space velocity, NHSV=27 000 h-1. Temperature: 350° C.

As apparent from Table 1, the same (within experimental uncertainty) NOx removal efficiency has been obtained in both tests.

What is claimed is:

1. Method for the reduction of amounts carbon monoxide, volatile organic compounds and nitrogen oxides in flue or exhaust gas comprising the steps of:
    introducing ammonia and/or a precursor thereof into the flue or exhaust gas;
    converting the precursor, if any, into ammonia;
    contacting the gas and the ammonia at a temperature of up to 350° C. with a layered catalyst comprising an upper first catalyst layer with an oxidation catalyst and an underlying second catalyst layer with an NH3-SCR catalyst supporting completely the first layer, and oxidizing at least part of the amounts of carbon monoxide and the volatile organic compounds in the upper first layer without affecting the ammonia further contained in the gas, and reducing the amounts of nitrogen oxides in the underlying second catalyst layer by reaction with the ammonia.

2. The method of claim 1, wherein the oxidation catalyst in the first layer consists of palladium, vanadium oxide and titanium oxide.

3. The method of claim 2, wherein the oxidation catalyst consists of 0.45 wt %, palladium, 4.5 wt % vanadium pentoxide and supported on titanium oxide.

4. The method of claim 1, wherein the first catalyst layer has a layer thickness of between 10 and 200 micron.

5. The method of claim 1, wherein the first catalyst layer has a layer thickness of between 10 and 50 micron.

6. The method of claim 1, wherein the NH3-SCR catalyst in the second catalyst layer comprises oxides of tungsten, molybdenum, vanadium and titanium.

7. The method of claim 1, wherein the flue or exhaust gas is additionally treated with a conventional not layered SCR catalyst either upstream or downstream the layered catalyst.

* * * * *